Patented Nov. 3, 1925.

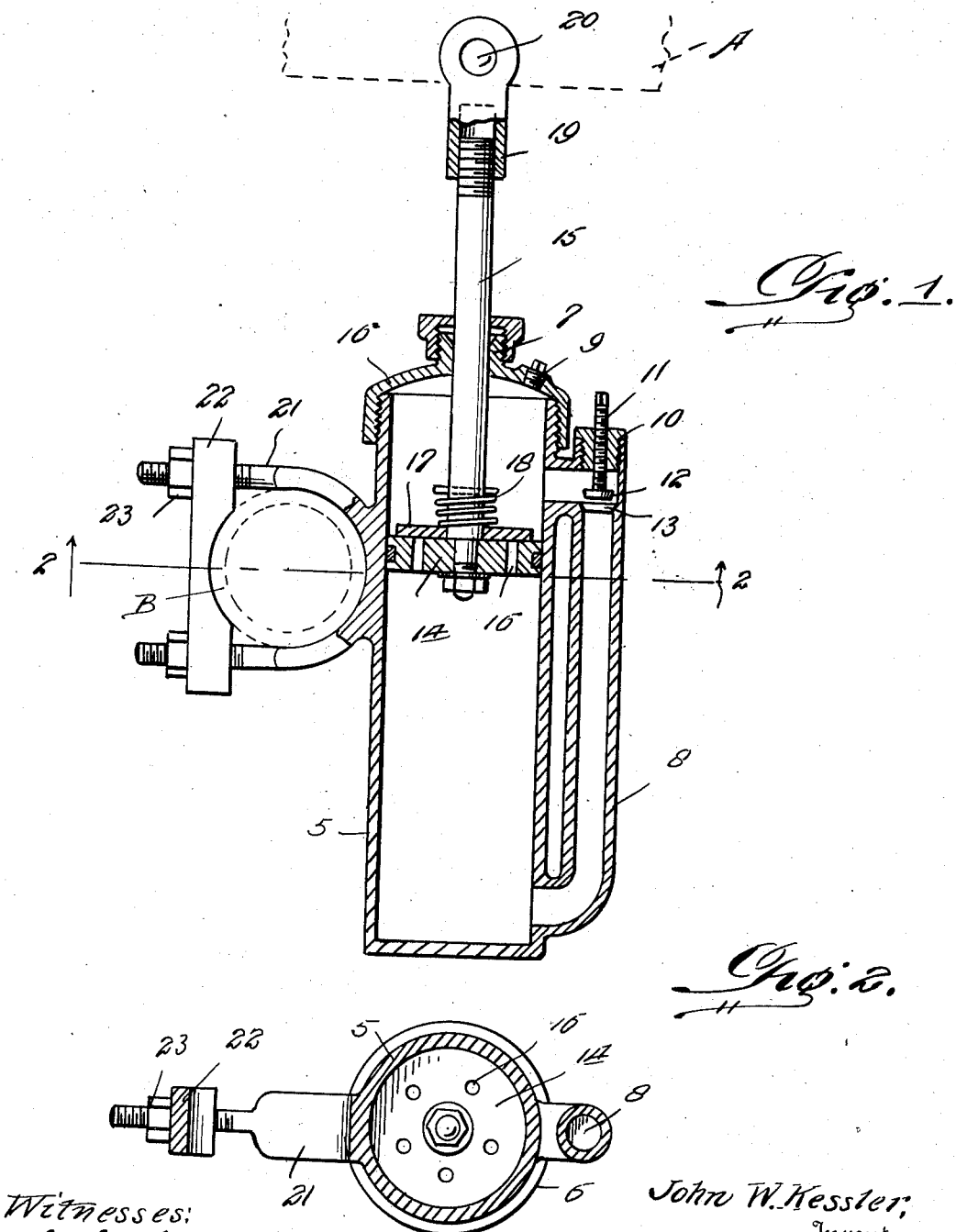

1,560,477

UNITED STATES PATENT OFFICE.

JOHN W. KESSLER, OF PHILADELPHIA, PENNSYLVANIA.

SHOCK ABSORBER.

Application filed June 23, 1923. Serial No. 647,255.

*To all whom it may concern:*

Be it known that I, JOHN W. KESSLER, a citizen of the United States, residing at Philadelphia, in the county of Philadelphia and State of Pennsylvania, have invented certain new and useful Improvements in Shock Absorbers, of which the following is a specification.

In carrying out the present invention, it is my purpose to provide a shock absorber primarily but not specifically adapted for attachment to the Chevrolet type of automobile, wherein the rebound of the vehicle springs will be retarded for thereby eliminating the usual bumping incident to the travel of the vehicle.

A further purpose of the invention is to provide a shock absorber that is adapted for attachment between the car frame and axle in a simple and expeditious manner, the present shock absorber being additionally characterized by the fact that the same may be manufactured and marketed at small cost, and one that will operate effectively under all conditions.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:

Figure 1—is a detail vertical cross section of my improved shock absorber applied to an automobile, and Figure 2—is a transverse cross section upon the line 2—2 of said figure, and looking upwardly in the direction of the arrows.

My shock absorber embodies a cylinder 5 of desirable length and diameter, open at its upper end and externally screw threaded at said end. Removably arranged upon the closed end of the cylinder is a closure cap 6 formed with a central opening surrounding which is a screw threaded neck 7.

At one side of the cylinder 5, there is formed a tube 8 that communicates at its opposite ends with the upper and lower ends of the cylinder for effecting a by-pass for oil, grease or similar substance to be placed within the cylinder through an opening in the cap 6 that is normally closed by a plug 9. The upper end of said tube 8 is formed with a screw threaded opening in which is arranged a screw threaded plug 10, this plug being formed with a screw threaded bore for the reception of a screw threaded stem 11 of a valve element 12, and is adapted to be moved towards and away from a seat 13, formed in said tube for adjusting the return flow of the fluid within the cylinder upon an upward movement of the piston 14, that is freely movable within the cylinder between the upper and lower ends of said by-pass.

The said piston 14 is secured upon the lower end of a rod 15, that is movable through the said opening in the end cap 6. This piston 14 is formed with a plurality of vertical passages 16 that are normally closed by a disk 17 that surrounds the rod 15, and maintained in closed relation with the piston through the medium of an expansible spring 18.

The upper end of the rod 15 is screw threaded for interengagement with a fitting 19 that is adapted to be pivotally secured at 20 to the vehicle frame, designated A in Figure 1.

Formed upon said cylinder 5 are a pair of spaced laterally directed and screw threaded rods 21 that are adapted for engagement over the vehicle axle B, and thereby secured thereto by a cross head 22 and binding nuts 23.

In view of the above description, it will at once be apparent when the device is attached to a motor vehicle between the points above mentioned, a downward movement of the car frame A with respect to the axle B will occasion a similar movement of the piston 14 within its cylinder. The oil or grease within the cylinder will find its way past the piston through the openings 16, it being of course apparent that the valve disk 17 will be raised by the compressing of the material within said cylinder.

A quick upward movement of the piston within the cylinder will be prevented in view of the fact that the fluid will necessarily have to pass to the lower portion of the cylinder through the by-pass or tube 8, this return of the fluid being adjustable by the valve 12.

Numerous advantages of a shock absorber of this type will be readily apparent to those skilled in the art, and even though I have herein set forth the most practical embodiment of the present invention with which I am at present familiar, it is nevertheless to be understood that minor changes may be made therein, without departing from the spirit and scope of the invention as hereinafter claimed.

Having thus described my invention, what I claim as new and desire to secure by Letters-Patent, is:

A shock absorber comprising a cylinder provided at its side with a tube portion which communicates with the upper and lower portions of the cylinder, said tube portions having a valve seat, a rod slidably mounted in the cylinder, a piston carried by the rod and housed in the cylinder between the ends of the tube portion, said piston having ports passing transversely therethrough, a valve disc mounted upon the stem and disposed over the ports, a spring carried by the stem and bearing against the disc and serving to hold the same in a closed position over the ports, a plug threaded in the tube portion opposite the valve seat thereof, and a valve adjustably mounted in the plug and adapted to be moved to increase or diminish the area of the passageway through the tube portion.

In testimony whereof I affix my signature.

JOHN W. KESSLER.